United States Patent
Li et al.

(10) Patent No.: US 10,452,262 B2
(45) Date of Patent: Oct. 22, 2019

(54) FLEXIBLE DISPLAY TOUCH CALIBRATION (71) Applicant: Lenovo (Beijing) Limited, Beijing (CN)

(72) Inventors: Bin Li, Beijing (CN); Yiqiang Yan, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 15/470,777

(22) Filed: Mar. 27, 2017

(65) Prior Publication Data

US 2017/0277429 A1 Sep. 28, 2017

(30) Foreign Application Priority Data

Mar. 25, 2016 (CN) .......................... 2016 1 0179800

(51) Int. Cl.
*G06F 3/041* (2006.01)
*G06F 3/0488* (2013.01)
*G06F 1/16* (2006.01)
*G06F 3/0354* (2013.01)

(52) U.S. Cl.
CPC ........ *G06F 3/04886* (2013.01); *G06F 1/1626* (2013.01); *G06F 1/1652* (2013.01); *G06F 1/1692* (2013.01); *G06F 3/03547* (2013.01); *G06F 3/0416* (2013.01); *G06F 3/0418* (2013.01); *G06F 3/04883* (2013.01); *G06F 2203/04101* (2013.01); *G06F 2203/04102* (2013.01); *G06F 2203/04106* (2013.01)

(58) Field of Classification Search
CPC ................. G06F 3/0418; G06F 1/1692; G06F 2203/04102; G06F 1/163; G06F 1/1652; G06F 1/1641; G06F 3/041; G06F 3/0416
See application file for complete search history.

(56) References Cited

U.S. PATENT DOCUMENTS

| | | | | |
|---|---|---|---|---|
| 9,575,512 B2* | 2/2017 | Cho | ....................... | G06F 1/1652 |
| 2015/0293620 A1* | 10/2015 | Cho | ....................... | G06F 1/1643 345/173 |
| 2016/0034047 A1* | 2/2016 | Lee | ....................... | G09G 5/373 345/156 |
| 2016/0139685 A1* | 5/2016 | Yang | ....................... | G06F 3/0416 345/173 |
| 2016/0246331 A1* | 8/2016 | Cho | ....................... | G06F 1/1652 |

* cited by examiner

*Primary Examiner* — Xuemei Zheng
(74) *Attorney, Agent, or Firm* — Kunzler Bean & Adamson (57) ABSTRACT

Embodiments described herein include devices and methods for detecting a current form of a touch display unit of an electronic device. The current form includes one of a first form and a second form different from the first form. A relative position of a display layer of the touch display unit with respect to a touch layer of the touch display unit in the second form is different from the relative position of the display layer relative to the touch layer in the first form. The method also includes determining a first touch coordinate corresponding to a first touch operation. The method also includes acquiring a coordinate transformation associated with the current form of the touch display unit. The method also includes applying the coordinate transformation to the first touch coordinate to identify a corresponding first display coordinate and a display object corresponding to the first display coordinate.

6 Claims, 4 Drawing Sheets

FLEXIBLE DISPLAY TOUCH CALIBRATION

FIELD

The present invention relates to the field of electronic technologies, and in particular, relates to an information processing method and an electronic device.

BACKGROUND

With the development of electronic technology, more and more portable electronic devices are brought into people's daily life, such as smart phones, tablet PCs and wearable devices. Moreover, with the development of display technology, flexible screens have also been incorporated into these electronic devices. Compared with conventional electronic devices, the flexible devices with flexible screens are lighter, thinner, and deformable, and have a lower power consumption. However, flexible devices suffer from several drawbacks.

SUMMARY

One embodiment of the preset disclosure includes a method. The method includes detecting a current form of a touch display unit of an electronic device. The current form includes one of a first form and a second form different from the first form. A relative position of a display layer of the touch display unit with respect to a touch layer of the touch display unit in the second form is different from the relative position of the display layer relative to the touch layer in the first form. The method also includes determining a first touch coordinate corresponding to a first touch operation. The method also includes acquiring a coordinate transformation associated with the current form of the touch display unit. The method also includes applying the coordinate transformation to the first touch coordinate to identify a corresponding first display coordinate and a display object corresponding to the first display coordinate.

Another embodiment of the present disclosure includes an electronic device. The electronic device includes a touch display unit and a processor. The processor is connected to the touch display unit and further detects a current form of a touch display unit of the electronic device. The current form includes one of a first form and a second form different from the first form. A relative position of a display layer of the touch display unit with respect to a touch layer of the touch display unit in the second form is different from the relative position of the display layer relative to the touch layer in the first form. The processor further detects a first touch operation and determines a first touch coordinate corresponding to the first touch operation at the touch display unit. The processor further determines a coordinate transformation corresponding to the current form. The processor further applies the coordinate transformation to the first touch coordinate to identify a display object.

Another embodiment of the present disclosure includes an electronic device. The electronic device includes a first detection unit, a second detection unit, an acquisition unit, and a determination unit. The first detection unit detects the current form of a touch display unit of an electronic device. The current form includes one of a first form and a second form different from the first form. A relative position of a display layer of the touch display unit with respect to a touch layer of the touch display unit in the second form is different from the relative position of the display layer relative to the touch layer in the first form. The second detection unit determines a first touch coordinate corresponding to a first touch operation detected at the touch display unit. The acquisition unit acquires a coordinate transformation associated with the current form. The determination unit applies the coordinate transformation to the first touch coordinate to determine a corresponding first display coordinate and a display object corresponding to the first display coordinate.

BRIEF DESCRIPTION OF THE DRAWINGS

The foregoing and other objects, features, and advantages of the present disclosure will become more apparent from the detailed descriptions of the embodiments of the present disclosure in conjunction with the drawings. The drawings are used to provide a further understanding of the embodiments of the present disclosure and constitute a part of the Description, which, together with the embodiments of the present disclosure, serve to explain the present disclosure and are not construed as a limitation to the present disclosure. Unless explicitly indicated, the drawings should not be understood as being drawn to scale. In the drawings, the same reference numerals generally represent the same components or steps. In the drawings.

DETAILED DESCRIPTION

The embodiments of the present invention provide a method and an electronic device for solving the technical problem in the prior art in which the deformation and misalignment between the touch layer and the display layer of the flexible screen result in reduced touch precision of the flexible devices.

In order to better illustrate the objectives, technical solutions, and advantages of the embodiments of the present invention, the technical solutions in the embodiments of the present invention are described clearly and completely by incorporating drawings in the embodiments of the present invention. It is noted that the embodiments described herein are not all, but rather only some of the embodiments of the present invention. Based on the embodiments of the present invention, other embodiments obtained by a person of ordinary skill in the art without creative work shall also fall within the protection scope of the present invention.

The term "and/or" in this description describes only an association relationship for describing associated objects and represents that three relationships may exist. For example, A and/or B may represent the following three cases: only A exists, both A and B exist, and only B exists. In addition, the symbol "/" in this description generally indicates an "or" relationship before and after the associated objects.

Figure 1:
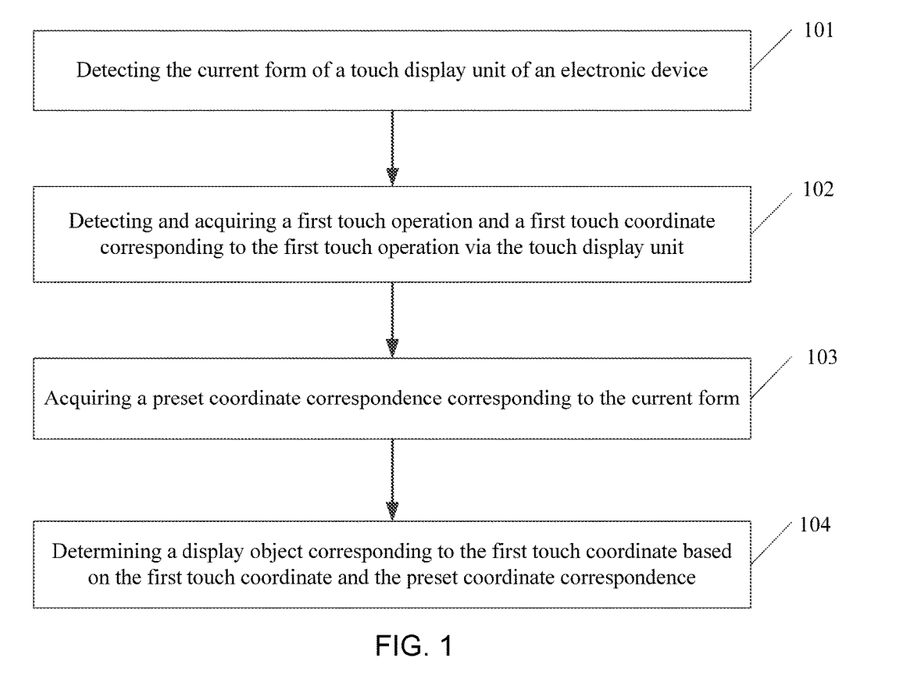
FIG. 1 is a schematic flow diagram of an information processing method in an embodiment of the present disclosure.

Referring to FIG. 1, it is a schematic flow diagram of a method in an embodiment of the present invention; this method comprises the following:

Block 101 includes detecting the current form of a touch display unit of an electronic device.

In some embodiments, the touch display unit has a first form and a second form different from the first form. The relative position of a display layer and a touch layer of the touch display unit under the second form may be different from the relative position of the display layer and the touch layer of the touch display unit under the first form.

Figure 2:
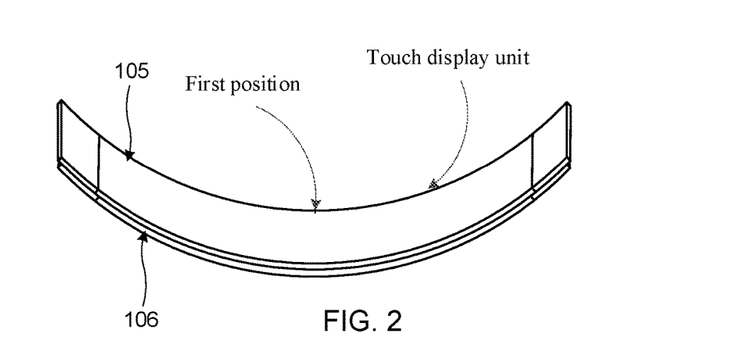
FIG. 2 is a side view of the electronic device in the bending form according to an embodiment of the present disclosure.
Figure 3:
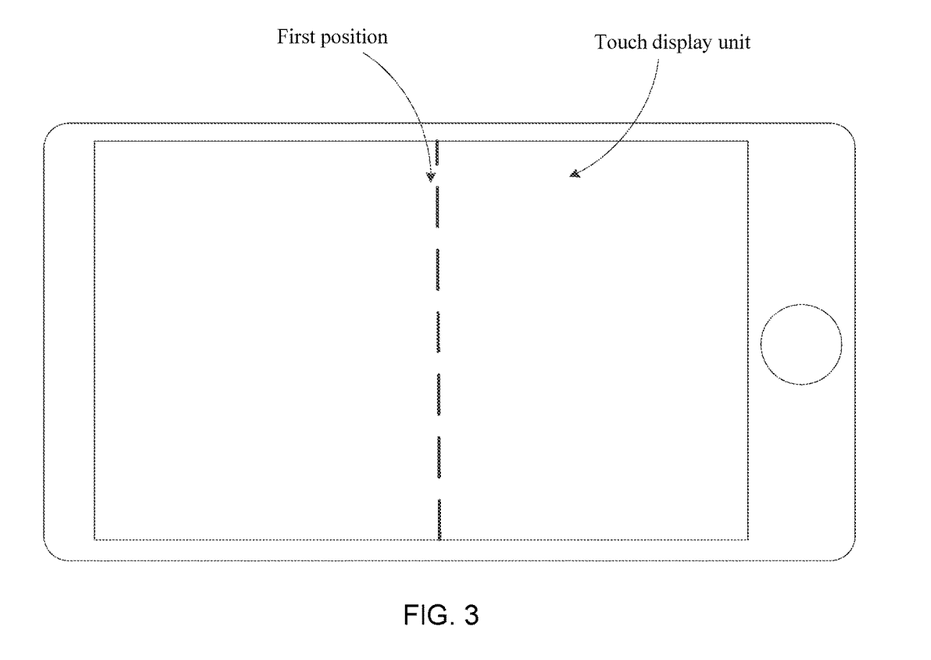
FIG. 3 is a front view of the electronic device in the flat form according to an embodiment of the present disclosure.
Figure 4:
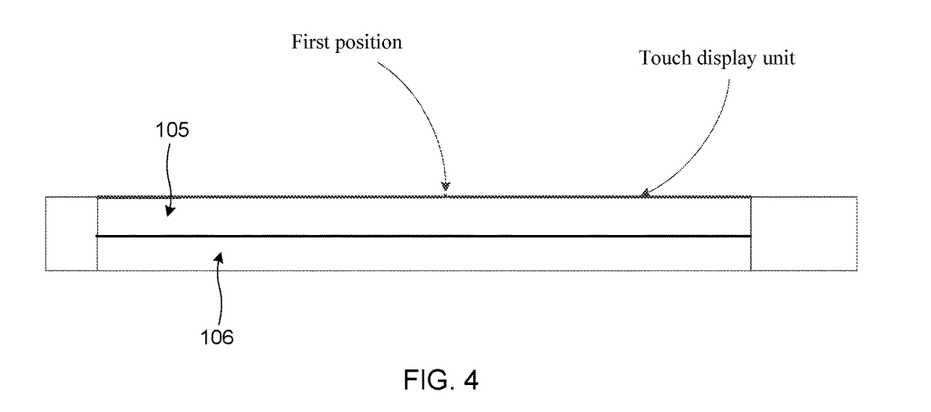
FIG. 4 is a side view of the electronic device in the flat form according to an embodiment of the present disclosure.

The electronic device can be a smart phone, a tablet personal computer (PC) and the like, which can be a flexible device, capable of deformation so that the device can take different forms. FIG. 2 is a schematic diagram of one embodiment of an electronic device in the bending form. The first form can be a bending form. In some embodiments, in the bending form, deformation occurs in the display layer 106 and touch layer 105 of the touch display unit. In the deformation process, the curvature radius of the touch layer 105 may be different from that of the display layer 106, thus misalignment is caused between the display layer 106 and the touch layer 105. The second form can be a flat form, and no deformation occurs in the display layer 106 and touch layer 105 of the touch display unit. FIG. 3 to FIG. 4 are, respectively, the front view and side view of an electronic device in the flat form. In the bending form, relative positions of the display layer 106 and the touch layer 105 are different from those in the flat form.

FIG. 2 is a schematic diagram of a first position on the touch display unit. In some embodiments, the touch display unit is in the first form (i.e., the bending form) if the first position of the touch display unit is in a bending form. In some embodiments, the touch display unit is in the second form (i.e., the flat form) if the first position of the touch display unit is in a flat form.

In some embodiments, the current form of the touch display unit can be detected through multiple detection modes. Two detection modes are given as examples below. However, other embodiments of the present disclosure are not limited to these two detection modes.

In some embodiments, a detection mode includes determining the form of the touch display unit via a resistor foil gauge provided at the first position. In some embodiments, the resistor foil gauge is capable of determining the current form of the touch display unit through resistance variation of the resistor foil gauge. The resistor foil gauge is one example of a sensing element which is capable of transforming the strain variation of a mechanical member deformed by force into resistance variation.

In other embodiments, the detection mode includes determining the form of the touch display unit by detecting the form variation of a part which is in synchronized movement with the touch display unit. For example, the first position of the touch display unit is provided with a rotating shaft and the form of the touch display unit can be determined by the movement of the rotating shaft at the first position.

In the two examples of possible detection modes mentioned above, the electronic device can determine the current form of the touch display unit by detecting the description parameters of the current form. For example, the description parameters can be the parameters which can describe the current form, such as the bending position, bending angle, and curvature. The electronic device can also determine the current form of the touch display unit by determining which form the current form is in among multiple predefined possible forms. For example, multiple predefined possible forms can be a flat form, first bending form, second bending form, etc., in which the bending position of the first bending form is different from the bending position of the second bending form, or the curvature of the first bending form is different from the curvature of the second bending form.

Block 102 includes detecting and acquiring a first touch operation and a first touch coordinate corresponding to the first touch operation via the touch display unit.

In block 102, the operating body can be a user's finger or a stylus. In some embodiments, when the user touches the touch display unit through the finger or the stylus, the touch display unit can detect a first touch coordinate corresponding to the touch operation of the user.

Block 103 includes acquiring a coordinate transformation corresponding to the current form.

In some embodiments, a coordinate transformation associated with the different forms of the touch display unit is pre-stored in the electronic device. In some embodiments, before the electronic device can detect multiple possible forms of the touch display unit, the respective coordinate transformation of the multiple possible forms is set in the electronic device. For example, before the electronic device can detect three possible forms of the touch display unit, the respective coordinate transformation of the three possible forms may be established in the electronic device.

In one embodiment of a method for establishing the coordinate correspondence, the coordinate transformation is a preset coordinate transformation relationship between the touch coordinate and the display coordinate.

For example, supposing a first side of the touch display unit is the axis x of the touch coordinate system, and a second side is the axis y; the first side of the touch display unit is the axis x of the display coordinate system, and the second side is the axis y. In this example, when the touch display unit is in the flat form, a coordinate value of the touch operation of a user in a touch coordinate system is the same as the coordinate value of the display coordinate system corresponding to the touch operation. For example: the display coordinate of an actual display position is (2, 1), and the touch coordinate detected via the touch display unit is (2, 1), wherein the coordinate unit is centimeters. When the touch display unit is in a bending form, the coordinate value of the touch operation of a user in a touch coordinate system is different from the coordinate value of the touch operation in a display coordinate system, for example: the display coordinate of an actual display position is (2, 1), the touch coordinate detected via the touch display unit is (1.98, 1). If transformation is not carried out, the electronic device will consider the display coordinate corresponding to the touch coordinate as (1.98, 1), and thus the display coordinate corresponding to the touch coordinate needs to be transformed, and the coordinate transformation coefficients can be $2/1.98 \approx 1.01$. For another example: the display coordinate of the actual display position is (1, 3), and the touch coordinate detected via the touch display unit is (0.98, 3), and the display coordinate corresponding to the touch coordinate needs to be transformed, and the coordinate transformation coefficients can be $1/0.98 \approx 1.02$. In practical application, the coordinate transformation coefficients can be more precise.

In above examples, when the horizontal ordinate of the display ordinate is different from the horizontal ordinate of the touch coordinate, the horizontal ordinate of the touch coordinate can be transformed by the coordinate transformation coefficients, so as to obtain the proper display coordinate. In some embodiments, if the horizontal coordinate of the display ordinate is different from the horizontal coordinate of the touch coordinate and the vertical coordinate of the display ordinate is different from the vertical coordinate of the touch coordinate, the coordinate transformation coefficients include a horizontal coordinate transformation coefficient and a vertical coordinate transformation coefficient, and the horizontal coordinate and vertical coordinate of the touch coordinate can be respectively transformed through the corresponding coordinate transformation coefficients, so as to obtain the display coordinate.

In some embodiments, when the touch display unit is in a flat form, the preset coordinate transformation relationship the display coordinate is the same as the touch coordinate. In some embodiments, when the touch display unit is in a bending form, the preset coordinate transformation relationship is shown in Table 1, wherein Table 1 is only for illustrative purpose, and the horizontal coordinate transformation coefficient is 1.01.

TABLE 1

| Touch coordinate | (1.98, 1) | (2, 1) | (2.1, 2) | (3, 2) |
|---|---|---|---|---|
| Display coordinate | (2, 1) | (2.02, 1) | (2.12, 2) | (3.03, 2) |

After the coordinate transformation corresponding to the current form is determined in block 103, the electronic device carries out the block 104: determining a preset display object corresponding to the first touch coordinate based on the first touch coordinate and the coordinate transformation.

In some embodiments, if the current form of the touch display unit is a flat form, the preset coordinate transformation relationship corresponding to the flat form is: the display coordinate is the same as the touch coordinate. Suppose that the touch coordinate is (1, 1), the display coordinate is (1, 1), and the display object on the display coordinate is then determined as the display object corresponding to the touch coordinate. In some embodiments, if the current form of the touch display unit is in a bending form, a preset coordinate transformation relationship corresponding to the bending form is shown in Table 1, and the electronic device can acquire the display coordinate corresponding to the touch coordinate by looking it up in the table. If the touch coordinate is (1.98, 1), then the display coordinate is (2, 1).

In the block 104, the display object can be touch icons, virtual keyboards, control buttons or application program interfaces on the touch display unit.

Another possible realization method: the coordinate transformation is a calibration value (coordinate transformation coefficient) correspondence between the touch coordinate and the calibration value.

In some embodiments, when the touch display unit is in a flat form, the display coordinate is (2, 1), and the touch coordinate detected via the touch display unit is (2, 1), the calibration values of the horizontal coordinate and the vertical coordinate of the touch coordinate are 1. In other words, the touch coordinate detected via the touch display unit is the same as the calibrated touch coordinate. In some embodiments, if the display coordinate is (2, 1), when the touch display unit is in a flat form, the touch coordinate detected via the touch display unit is (2, 1); when the touch display unit is in a bending form, the touch coordinate detected via the touch display unit is (1.98, 1), and the calibration value of the horizontal coordinate is the ratio of the touch coordinate in the flat form to the touch coordinate in the bending form, which is specifically: 2/1.98≈1.01.

In some embodiments, after the calibration value correspondence corresponding to the current form is determined in the block 103, block 104 can be executed by the electronic device: determining a display object corresponding to the first touch coordinate based on the first touch coordinate and the coordinate transformation. Block 104 may include calibrating the first touch coordinate to acquire a calibrated second touch coordinate based on the calibration value corresponding to the current form. For example, when the first touch coordinate detected via the touch display unit is (3.1, 1), the calibration value is 1.01, and then the calibrated second touch coordinate is (3.13, 1).

Block 104 may also include determining a second display coordinate corresponding to the second touch coordinate. In some embodiments, after the touch coordinate is calibrated, the coordinate value in the touch coordinate system is the same as the coordinate value of the touch operation in the display coordinate system. For example, when the second touch coordinate is (3.13, 1), the corresponding second display coordinate is (3.13, 1).

Block 104 may also include determining the object displayed on the second display coordinate as the display object.

In the two examples mentioned above, the coordinate transformation may be a factory setting correspondence of the electronic device while users may also configure the coordinate transformation.

Figure 5:
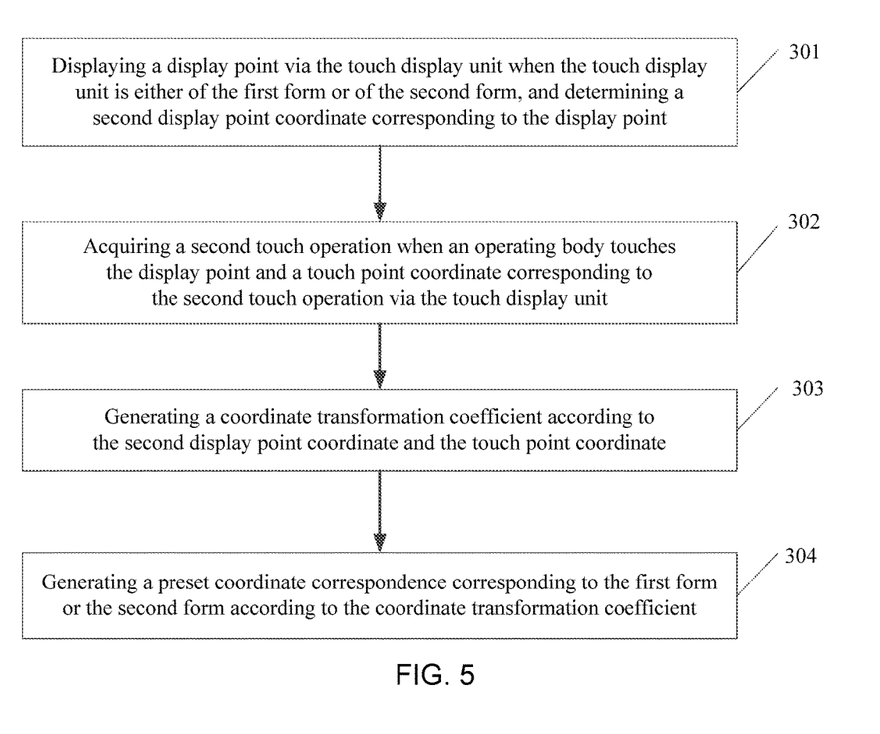
FIG. 5 is a schematic flow diagram of a method for generating the coordinate transformation in an embodiment of the present disclosure.

The illustrated embodiment of FIG. 5 includes, at block 301, displaying a display point via the touch display unit when the touch display unit is either of the first form or of the second form, and determining a second display point coordinate corresponding to the display point.

Block 302 includes acquiring a second touch operation when an operating body touches the display point and a touch point coordinate corresponding to the second touch operation via the touch display unit.

In some embodiments, the operating body can be the finger of a user or a stylus. Users can use fingers or stylus to touch the display point to make sure the touch display unit can detect the second touch operation and acquire the touch point coordinate corresponding to the second touch operation while displaying a display point on the touch display unit.

Block 303 includes generating a coordinate transformation coefficient according to the second display point coordinate and the touch point coordinate.

In block 103, description for the generation of coordinate transformation coefficient has already been presented, thus repeated description will not be given herein.

Block 304 includes generating the coordinate transformation corresponding to the first form or the second form according to the coordinate transformation coefficient.

In some embodiments, if the coordinate transformation is a preset coordinate transformation relationship, determine the corresponding display coordinate of the touch coordinate in different forms according to the coordinate transformation coefficient; if the coordinate transformation is a calibration value correspondence, determine different forms of calibration value correspondence according to the coordinate transformation coefficient.

Figure 6:
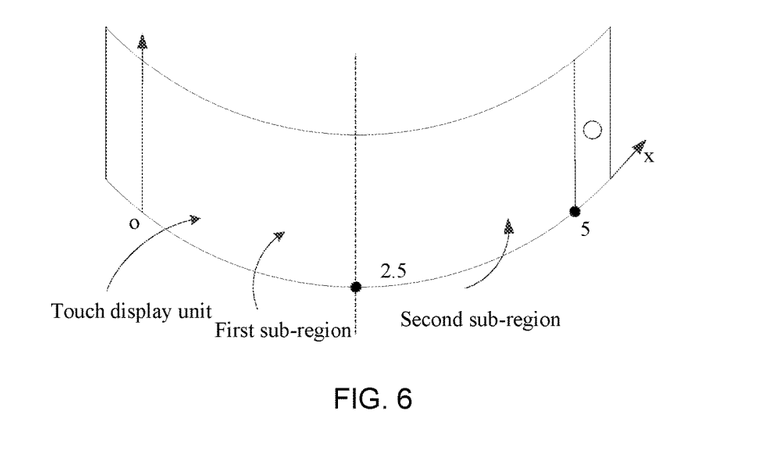
FIG. 6 is a schematic diagram of the first sub-region and the second sub-region according to an embodiment of the present disclosure.

In an embodiment of the present disclosure, if the touch display unit is in a bending form, the touch display unit may also be divided into several different sub-regions and the coordinate transformation of each sub-region can be determined respectively. For example, if the coordinate transformation is a calibration value correspondence, the touch display unit is divided into two sub-regions, as shown in FIG. 6, in which the first sub-region is the region between x=0 and x=2.5, the second sub-region is the region between x=2.5 and x=5. In some embodiments, when the touch display unit is in a bending form, the corresponding calibration value of the first region is 1.010, and the corresponding calibration value of the second region is 1.013, then when the touch coordinate detected in the touch display unit is (2, 1.5) and due to that the touch coordinate is located in the first sub-region, the touch coordinate is calibrated according to calibration value 1.010, and the calibrated touch coordinate is (2.02, 1.5).

Figure 7:
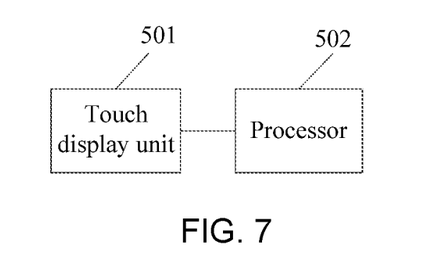
FIG. 7 is a schematic diagram of the hardware structure of an electronic device in an embodiment of the present disclosure.

Based on the same inventive concept, as shown in FIG. 7, an embodiment of the present disclosure further provides an electronic device.

In the illustrated embodiment of FIG. 7, the electronic device includes a touch display unit 501 and a processor 502 connected to the touch display unit 501.

In some embodiments, the processor 502 detects the current form of the touch display unit 501 of the electronic device. In some embodiments, the touch display unit 501 has a first form and a second form different from the first form. The relative position of a display layer and a touch layer of the touch display unit 501 under the second form may be different from the relative position of the display layer and the touch layer of the touch display unit 501 under the first form. The first touch operation and the first touch coordinate corresponding to the first touch operation may be detected and acquired via the touch display unit 501. The coordinate transformation corresponding to the current form may also be acquired. A display object corresponding to the first touch coordinate may be determined based on the first touch coordinate and the coordinate transformation.

In other embodiments, the coordinate transformation is a preset coordinate transformation relationship between the touch coordinate and the display coordinate; and the processor 502 may be used for:

transforming the first touch coordinate into a first display coordinate based on the preset coordinate transformation relationship; and determining the object displayed on the first display coordinate as the display object.

In further embodiments, the coordinate transformation is a calibration value correspondence between the touch coordinate and the calibration value; and the processor 502 may be used for:

calibrating the first touch coordinate to acquire a calibrated second touch coordinate based on the calibration value corresponding to the current form;

determining a second display coordinate corresponding to the second touch coordinate; and determining the object displayed on the second display coordinate is the display object.

In other embodiments, the processor 502 is further used for:

displaying a display point via the touch display unit 501 and determining a second display point coordinate corresponding to the display point, prior to the coordinate transformation corresponding to the current form is acquired and when the touch display unit 501 is either of the first form or of the second form;

acquiring a second touch operation when an operating body touches the display point and a touch point coordinate corresponding to the second touch operation via the touch display unit 501;

generating a coordinate transformation coefficient according to the second display point coordinate and the touch point coordinate; and generating a coordinate transformation corresponding to the first form or the second form according to the coordinate transformation coefficient.

In further embodiments, the touch display unit 501 is in the first form if the first position of the touch display unit 501 is in a bending form; the touch display unit 501 is in the second form if the first position of the touch display unit 501 is in a flat form.

Figure 8:
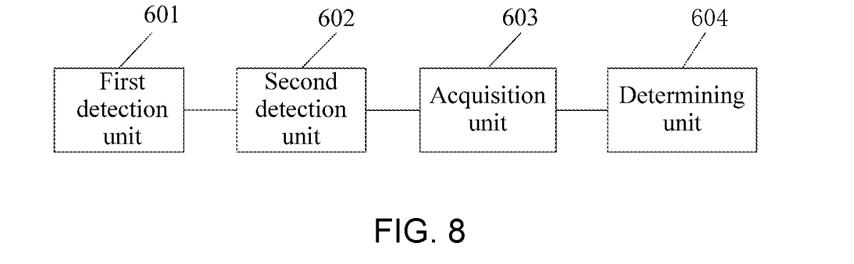
FIG. 8 is a schematic diagram of the function module of an electronic device in an embodiment of the present disclosure.

Based on the same inventive concept, as shown in FIG. 8, an embodiment of the present invention further provides an electronic device, which comprises:

a first detection unit 601, used for detecting the current form of a touch display unit of an electronic device, wherein the touch display unit has a first form and a second form different from the first form; the relative position of a display layer and a touch layer of the touch display unit under the second form is different from the relative position of the display layer and the touch layer of the touch display unit under the first form;

a second detection unit 602, used for detecting and obtaining a first touch operation and a first touch coordinate corresponding to the first touch operation via the touch display unit;

an acquisition unit 603, used for acquiring a coordinate transformation corresponding to the current form; and a determination unit 604, used for determining a display object corresponding to the first touch coordinate based on the first touch coordinate and the coordinate transformation.

In some embodiments, the coordinate transformation is a preset coordinate transformation relationship between the touch coordinate and the display coordinate; and the determination unit 604 is used for:

transforming the first touch coordinate into a first display coordinate based on the preset coordinate transformation relationship; and determining the object displayed on the first display coordinate as the display object.

In further embodiments, the coordinate transformation is a calibration value correspondence between the touch coordinate and the calibration value, and the determination unit 604 is used for: calibrating the first touch coordinate to acquire a calibrated second touch coordinate based on the calibration value corresponding to the current form;

determining a second display coordinate corresponding to the second touch coordinate; and determining the object displayed on the second display coordinate as the display object.

In other embodiments, the electronic device further includes:

a display point display unit, used for displaying a display point via the touch display unit and determining a second display point coordinate corresponding to the display point, prior to the coordinate transformation corresponding to the current form is acquired and when the form of the touch display unit is either the first form or the second form;

a third detection unit, used for acquiring a second touch operation when an operating body touches the display point and a touch point coordinate corresponding to the second touch operation via the touch display unit;

a first generation unit, used for generating a coordinate transformation coefficient according to the second display point coordinate and the touch point coordinate;

a second generation unit, used for generating the coordinate transformation corresponding to the first form or the second form according to the coordinate transformation coefficient.

In further embodiments, the touch display unit is in the first form if the first position of the touch display unit is in a bending form; the touch display unit is in the second form if the first position of the touch display unit is in a flat form.

One or more technical solutions as provided in the embodiments of the present invention have at least the following technical effects or advantages:

In the embodiments of the present invention, the method comprises detecting the current form of a touch display unit of an electronic device; detecting and acquiring a first touch operation and a first touch coordinate corresponding to the first touch operation via the touch display unit; acquiring the coordinate transformation corresponding to the current form; and determining a display object corresponding to the first touch coordinate based on the first touch coordinate and the coordinate transformation. The coordinate transformation corresponding to the current form of the touch display unit can be determined by detecting and determining the different forms of the touch display unit. Thus, it is clear that the different forms of the touch display unit correspond to different coordinate transformations, then the display object corresponding to the first touch coordinate detected via the touch display unit can be determined according to a coordinate transformation, so as to solve the technical problem in the prior art that deformation and misalignment between the touch layer and the display layer of the flexible screen resulting in reduced touch precision of the flexible device, thereby achieving the technical effects of ensuring touch precision of the flexible device when deformation and misalignment between the touch layer and the display layer of the flexible screen occur.

Those skilled in the art should understand that the embodiments of the present invention may be embodied as a method, a system or a computer program product. Therefore, the embodiments of the present invention may be in the form of a hardware-only embodiment, a software-only embodiment, or an embodiment of a combination of hardware and software. Moreover, the present invention may be in the form of a computer program product which is implemented on one or more computer usable storage media (including, but not limited to, disk storage, CD-ROM, optical storage) which contains computer usable program codes thereon.

The present invention is described with reference to the methods, devices (systems) and flow diagrams and/or block diagrams of computer program products according to the embodiments of the present invention. It should be understood that computer program commands may be used to implement each process and/or block in the flow diagrams and/or block diagrams, and combinations of processes and/or blocks in the flow diagrams and/or block diagrams. These computer program commands may be provided on a general computer, a dedicated computer, an embedded processor or other programmable data processing devices to generate a machine, so that the commands, which are executed via the processor of the computer or other programmable data processing devices, create means for implementing the functions specified in one or more flows of the flow diagram and/or one or more blocks of the block diagram.

These computer program commands may also be stored in a computer readable memory that can direct a computer or other programmable data processing devices to function in a particular manner, so that the commands stored in the computer readable memory produce an article of manufacture including commanding means for implementing the function specified in one or more flows of the flow diagram and/or one or more blocks of the block diagram.

These computer program commands may also be loaded onto a computer or other programmable data processing devices to produce a series of operational steps to be performed on the computer or other programmable devices to produce a computer implemented process so that the commands, which are executed on the computer or other programmable devices, provide steps for implementing the functions specified in one or more flows of the flow diagram and/or one or more blocks of the block diagram.

In some embodiments, computer program commands corresponding to the information processing method in the embodiments of the present invention may be stored in a storage medium such as an optical disk, a hard disk or a USB flash drive, and when the computer program commands in the storage medium corresponding to the information processing method are read or executed by an electronic device, the computer program commands include the following processes:

detecting a current form of a touch display unit of an electronic device, wherein the touch display unit has a first form and a second form different from the first form; the relative position of a display layer and a touch layer of the touch display unit under the second form is different from the relative position of the display layer and the touch layer of the touch display unit under the first form;

detecting and acquiring a first touch operation and a first touch coordinate corresponding to the first touch operation via the touch display unit;

acquiring a coordinate transformation corresponding to the current form;

determining a display object corresponding to the first touch coordinate based on the first touch coordinate and the coordinate transformation.

In other embodiments, the coordinate transformation is a preset coordinate transformation relationship between the touch coordinate and the display coordinate; when the computer commands corresponding to the step of determining the display object corresponding to the first touch coordinate based on the first touch coordinate and the coordinate transformation, which are stored in the storage medium, are specifically executed, the following steps are included:

transforming the first touch coordinate into a first display coordinate based on the preset coordinate transformation relationship;

determining the object displayed on the first display coordinate as the display object.

In some embodiments, the coordinate transformation is a calibration value correspondence between the touch coordinate and the calibration value;

When the computer commands corresponding to the step of determining the display object corresponding to the first touch coordinate based on the first touch coordinate and the coordinate transformation, which are stored in the storage medium, are specifically executed, the following processes are included:

calibrating the first touch coordinate to acquire a calibrated second touch coordinate based on the calibration value corresponding to the current form;

determining a second display coordinate corresponding to the second touch coordinate;

determining the object displayed on the second display coordinate as the display object.

In some embodiments, the storage medium also has other computer commands stored therein, which are executed prior to the execution of the computer commands corresponding to the step of acquiring a coordinate transformation corresponding to the current form, and when such computer commands are executed, the following processes are included:

displaying a display point via the touch display unit when the touch display unit is either of the first form or of the second form, and determining a second display point coordinate corresponding to the display point;

acquiring a second touch operation when an operating body touches the display point and a touch point coordinate corresponding to the second touch operation via the touch display unit;

generating a coordinate transformation coefficient according to the second display point coordinate and the touch point coordinate;

generating a coordinate transformation corresponding to the first form or the second form according to the coordinate transformation coefficient.

In other embodiments, the touch display unit is in the first form if the first position of the touch display unit is in a bending form; the touch display unit is in the second form if the first position of the touch display unit is in a flat form.

It is clear that various variations and modifications to the present invention may be made by those skilled in the art without departing from the spirit and scope of the present invention. Accordingly, if these variations and modifications to the present invention fall within the scope of the claims of the present invention and the equivalents thereof, the present invention also intends to encompass these variations and modifications.

What is claimed is:

1. A method, comprising:

detecting a current form of a touch display unit of an electronic device, wherein the current form comprises one of a first form and a second form different from the first form, a relative position of a display layer of the touch display unit with respect to a touch layer of the touch display unit in the second form is different from the relative position of the display layer relative to the touch layer in the first form;

determining a first touch coordinate corresponding to a first touch operation detected at the touch display unit;

acquiring a coordinate transformation associated with the current form of the touch display unit based on a change in the relative position of the display layer with respect to the touch layer, wherein the coordinate transformation comprises a calibration value to correlate the first touch coordinate to a display object;

applying the coordinate transformation to the first touch coordinate to identify a corresponding first display coordinate and the display object corresponding to the first display coordinate, wherein identifying the display object corresponding to the first touch operation further comprises:

calibrating the first touch coordinate to acquire a calibrated second touch coordinate based on the calibration value which corresponds to the current form;

determining a second display coordinate corresponding to the second touch coordinate; and determining the display object displayed at the second display coordinate;

displaying a display point on the touch display unit and determining a display point coordinate corresponding to the display point;

detecting a calibration touch operation at the touch display unit;

generating a coordinate transformation coefficient based on the display point coordinate and the calibration touch operation; and associating the coordinate transformation coefficient with the coordinate transformation based on the current form of the touch display unit.

2. The method according to claim 1, wherein the coordinate transformation is a transformation relationship for transforming the first touch coordinate to the first display coordinate corresponding to the current form of the touch display unit, and wherein identifying the display object corresponding to the first touch operation further comprises:

transforming the first touch coordinate into the first display coordinate based on the transformation relationship; and identifying an object displayed on the touch display unit at the first display coordinate as the display object.

3. The method according to claim 1, wherein the touch display unit is identified as having the first form in response to a determination that the first position of the touch display unit is in a bending form and the touch display unit is identified as having the second form in response to a determination that the first position of the touch display unit is in a flat form.

4. An electronic device, comprising:

a touch display unit;

a processor that is connected to the touch display unit and further:

detects a current form of the touch display unit of the electronic device, wherein the current form comprises one of a first form and a second form different from the first form, a relative position of a display layer of the touch display unit with respect to a touch layer of the touch display unit in the second form is different from the relative position of the display layer relative to the touch layer in the first form;

detects a first touch operation and determines a first touch coordinate corresponding to the first touch operation at the touch display unit;

determines a coordinate transformation corresponding to the current form based on a change in the relative position of the display layer with respect to the touch layer, wherein the coordinate transformation comprises a calibration value to correlate the first touch coordinate to the display object;

applies the coordinate transformation to the first touch coordinate to identify a display object;

calibrates the first touch coordinate to acquire a calibrated second touch coordinate based on the calibration value which corresponds to the current form;

determines a second display coordinate corresponding to the second touch coordinate;

determines the display object displayed at the second display coordinate;

displays a display point on the touch display unit and determines a display point coordinate corresponding to the display point prior to acquiring the coordinate transformation;

detects a calibration touch operation at the touch display unit;

generates a coordinate transformation coefficient based on the display point coordinate and the calibration touch operation; and associates the coordinate transformation coefficient with the coordinate transformation based on the current form for the of the touch display unit.

5. The electronic device according to claim 4, wherein the coordinate transformation is a transformation relationship for transforming the first touch coordinate to the first display coordinate corresponding to the current form of the touch display unit, wherein the processor further:

transforms the first touch coordinate into the first display coordinate based on the transformation relationship; and identifies an object displayed on the touch display unit at the first display coordinate as the display object.

6. The electronic device according to claim 4, wherein the touch display unit is identified as having the first form in response to a determination that the first position of the touch display unit is in a bending form, and the touch display unit is identified as having the second form in response to a determination that the first position of the touch display unit is in a flat form.

* * * * *